United States Patent [19]

Takeuchi et al.

[11] Patent Number: 5,372,988
[45] Date of Patent: Dec. 13, 1994

[54] THERMAL TRANSFER PRINTING DYESHEET

[75] Inventors: Hikaru Takeuchi, Saitama; Kazuhiko Sakata, Tsukuba, both of Japan

[73] Assignee: Imperial Chemical Industries PLC, London, England

[21] Appl. No.: 992,658

[22] Filed: Dec. 18, 1992

[30] Foreign Application Priority Data

Dec. 18, 1991 [JP] Japan .................................. 3-335136

[51] Int. Cl.$^5$ ........................ B41M 5/035; B41M 5/38
[52] U.S. Cl. .................................. 503/227; 428/195; 428/207; 428/323; 428/331; 428/704; 428/913; 428/914
[58] Field of Search ................... 8/471; 428/195, 207, 428/323, 331, 704, 913, 914; 503/227

[56] References Cited

U.S. PATENT DOCUMENTS 4,829,050  5/1989  Henzel et al. ...................... 503/227

FOREIGN PATENT DOCUMENTS 0137741  4/1985  European Pat. Off. ............ 503/227
0138483  4/1985  European Pat. Off. ............ 503/227
0295483  12/1988  European Pat. Off. ............ 503/227

*Primary Examiner*—B. Hamilton Hess
*Attorney, Agent, or Firm*—Cushman, Darby & Cushman

[57] ABSTRACT

A thermal transfer printing dyesheet comprising a sheet substrate having at least a thermal transfer dyecoat on one face and a heat resisting slipping layer on the other face, is characterised in that the heat resisting slipping layer comprises a silicone resin powder having silsesquioxane structure, and at least one of a metal salt powder of a higher fatty acid and a metal salt powder of a higher fatty acid phosphate. This dyesheet showed a superior travelling, has an outstanding freedom from scratching, does not develop creases and moreover its storage stability was an excellent one having no adverse effect on the dyecoat.

4 Claims, No Drawings

THERMAL TRANSFER PRINTING DYESHEET

The invention relates to a thermal transfer printing dyesheet to be used in combination with a thermal transfer receiver having a dye receiving layer to receive a dye to transfer and to record onto the receiver by a heating mean such as a thermal head, etc. corresponding to a image signal, and particularly it relates to a thermal transfer printing dyesheet to offer a stable travelling at printing and a distinct image by selecting and improving the lubricant to compose the slipping layer of the thermal transfer printing dyesheet.

PRIOR ART

As for the thermal transfer image printing system, there are, in general, a thermal melt transfer printing system and a thermal diffusion transfer printing system. As to the thermal diffusion transfer printing system, a thermal transfer printing dyesheet having a dyecoat comprising a thermal diffusion dye and a binder on one face and a heat resisting slipping layer on the other face of a substrate is used and it is a system to transfer and to record by a heating mean such as a thermal head, etc. corresponding to a image signal. In order to give rolling property at printing of the thermal transfer printing dyesheet, various lubricants have been used on the back layer of the substrate to the dyecoat.

As for these lubricants, for example, a fluorine group resin, a silicone oil, a silicone group wax, a higher fatty, acid amide, a long chain alkyl acrylate, a metal salt of a higher fatty acid, etc. shown in Japanese Tokukai Sho JA 55-7462-A, JA 56-155794-A, JA 61-127389-A, JA 2-42282-A, etc. are common.

However when these lubricants were used in the heat resisting slipping layer of the thermal transfer printing dyesheet, there were problems such as that an image with a good gradation was not attained, an image deterioration happened by so-called "scratching" which to form lines longitudinal to the transfer direction in the print image, etc. There was also a case that the frictional force in a printing section and a non-printing section between the thermal head and the heat resisting slipping layer was largely different at printing, it led to form a crease in the thermal transfer printing dyesheet and there was a case that it caused the print image deterioration. In addition, there were also problems such as a poor long term storage stability of the thermal transfer printing dyesheet, and inferior travelling property when printing in high temperature and high humidity conditions.

Subject to be solved by the invention

The invention seeks to reduce the aforementioned drawbacks seen in the prior art technology, to improve the travelling property during printing, and to provide a thermal transfer printing dyesheet having an excellent storage stability yet capable of producing print images of excellent quality.

Means to solve the subject

According to the present invention, a thermal transfer printing dyesheet comprises a sheet substrate having at least a thermal transfer dyecoat on one face and a heat resisting slipping layer on the other face, characterised in that the heat resisting slipping layer comprises a silicone resin powder having silsesquioxane structure, and at least one of a metal salt powder of a higher fatty acid and a metal salt powder of a higher fatty acid phosphate.

The silicone resin powder having silsesquioxane structure has an effect to reduce the frictional force at the print section between the thermal head and the heat resisting slipping layer, and its mean particle size is preferably 5 $\mu$m or less, and its incorporation amount in the heat resisting slipping layer is preferably 0.2–60 volume %, especially at least 0.5 volume %.

The mean particle size of the silicone resin powder and the metal salt powder together is preferably 5 $\mu$m or less and their total incorporation amount in the heat resisting slipping layer is 0.2–60 volume %. Our preferred mixing ration ((a)/(a)+(b), where (a) is the silicone resin powder having silsesquioxane structure and (b) is the metal salt powder of a higher fatty acid and/or metal salt powder of a higher fatty acid phosphate) is 5 weight % or more. A dispersing agent can be incorporated to assist in preparation of the coating composition, but this is not always necessary.

As for the substrate to be used in the invention, polyester film, polyamide film, polycarbonate film, polysulphone film, polypropylene film, etc. can be enumerated. Among these, the polyester film is especially preferable from views of mechanical strength, dimensional stability, heat resistance, etc.

The thickness of the substrate is 1–30 $\mu$m, and is preferably 2–15 $\mu$m.

The heat resisting slipping layer to be used in this invention is formed by coating a coating solution prepared by mixing the silicone resin powder, or the silicone resin powder and the metal salt powder of a higher fatty acid and/or the metal salt powder of a higher fatty acid phosphate with a thermoplastic polymer, a thermosetting resin or a photopolymerisable resin, and by curing with drying, a heating treatment or an active beam irradiation.

As for the aforementioned thermoplastic polymers, for example, acrylic polymers, polyesters, poly-vinyl chloride/vinyl acetate copolymers, acrylonitrile/styrene copolymers, vinylidene fluoride polymers and polyamides can be enumerated.

As for the aforementioned thermosetting resins, for example, epoxy resins, acrylic resins, melamine resins, urea resins, alkyd resins, and phenoxy resins can be enumerated.

As for the aforementioned photopolymerisable resin, for example, polyester acrylates, epoxy acrylates and urethane acrylates can be enumerated.

The silicone resin powder having silsesquioxane structure to be used in this invention is hereinafter explained. The silsesquioxane structure means a structure wherein each of 3 bondings of a silicon atom are directly bound oxygen atoms as shown in a chemical formula (1), and as for the silicone resin to be used in this invention, it is compounds having 2 dimensional and/or 3 dimensional crosslinking structure wherein the remaining 1 bonding is substituted with C1-C17 alkyl group which can be branched, alkylsilyl group, silylalkyl group, aryl group, amino group, epoxy group, vinyl group, etc.

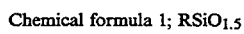

Chemical formula 1; $RSiO_{1.5}$ wherein, R represents C1-C17 alkyl group which can be branched, alkylsilyl group, silylalkyl group, aryl group, amino group, epoxy group, vinyl group, etc.

As for the silicone resin powder having silsesquioxane structure, in general, a silicone resin powder having polymethyl silsesquioxane structure can be easily obtained, and concretely, KMP-590 (Shinetsu Chemical product); Tospearl 105, Tospearl 108, Tospearl 120, Tospearl 130, Tospearl 145 and Tospearl 240 (Toshiba Silicone product); Torefil R-925 and Torefil 930 (Toray Dowcorning product), etc. are available. These silicone resin powder can be used independently or by mixing 2 or more.

The metal salt powder of a higher fatty acid and/or the metal salt powder of a higher fatty acid phosphate to be used in this invention is hereinafter explained. As for the metal salt of a higher fatty acid to be used in this invention, for example, zinc laurate, calcium laurate, magnesium laurate, zinc stearate, calcium stearate, aluminium stearate, barium stearate, lithium stearate, lithium 12-hydroxystearate, zinc behenate, calcium behenate, etc. can be enumerated.

The metal salt of a higher fatty acid phosphate to be used in this invention is a compound shown by a chemical formula (2) or a chemical formula (3), it is, for example, zinc stearate phosphate, zinc laurate phosphate, zinc myristate phosphate, zinc nonanoate phosphate, zinc octanoate phosphate, calcium stearate phosphate, aluminium stearate phosphate, barium stearate phosphate, magnesium stearate phosphate, aluminium laurate phosphate, aluminium dodecanoate phosphate, aluminium nonanoate phosphate, aluminium nonanoate phenylphosphate, or the like.

The metal salt powder of a higher fatty acid and/or the metal salt powder of a higher fatty acid phosphate can be used independently or by mixing 2 or more.

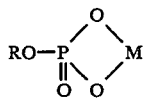  Chemical formula 2

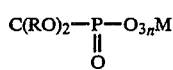  Chemical formula 3 wherein R is an alkyl group or an alkylphenyl group of C8-C30 which can be branched, M is a metal atom and n represents an integral number of 2 or 3.

As for the mean particle size of the silicone resin powder, the metal salt powder of a higher fatty acid and the metal salt powder of a higher fatty acid phosphate, 5 $\mu$m or less is preferable, and if one which exceeds 5 $\mu$m is used, an uniformity of a print image in a low concentration section becomes inferior.

As for the total incorporation amount of the silicone resin powder or the metal salt powder of a higher fatty acid and/or the metal salt powder of a higher fatty acid phosphate, it is preferable to incorporate 0.2 volume % or more and 60 volume % or less in the heat resisting slipping layer, if its incorporation amount is below 0.2 volume %, it cause a problem that the travelling becomes inferior, and if the incorporation amount exceeds 60 volume %, a solid section of a print image becomes rough and the silicone resin powder, the metal salt powder of a higher fatty acid and/or the metal salt powder of a higher fatty acid phosphate stick to the thermal head resulting 1 cause of a durability deterioration of the thermal head.

Additionally, when the metal salt powder of a higher fatty acid and/or the metal salt powder of a higher fatty acid phosphate is/are used, as for the mixing ratio ((a)/(a)+(b)) of (a) the silicone resin powder and (b) the metal salt powder of a higher fatty acid and/or metal salt powder of a higher fatty acid phosphate, it is preferable to be 5 weight % or more. If it is less than 5 weight %, the frictional force at a print section becomes large, and it tends to easily develop creases in the thermal transfer printing dyesheet in a case that power input to the thermal head is high.

The coating solution to form the heat resisting slipping layer can be prepared by the aforementioned thermoplastic polymer, thermosetting resin or photopolymerisable resin with the silicone resin powder, or the silicone resin powder and the metal salt powder of a higher fatty acid and/or the metal salt powder of a higher fatty acid phosphate by using a solvent, for example, an alcohol group solvent such as ethanol, methanol, isopropanol, etc.; a ketone group solvent such as acetone, methyl ethyl ketone, methyl butyl ketone, etc.; an ester group solvent such as ethyl acetate, butyl acetate, ethylene glycol monoacetate, diethylene glycol monoacetate, etc.; an aromatic hydrocarbon group solvent such as toluene, xylene, benzene, etc.; a halogenated hydrocarbon group solvent such as dichloroethane, chloroform, carbon tetrachloride, etc.

The solvent can be a mixed solvent consisting of 2 or more of the above, and it can also add known additives such as an antioxidant, an antistatic agent, a leveling agent, etc.

Moreover, to the coating solution to form the heat resisting slipping layer, known lubricants such as talc, calcium carbonate, barium sulphate, mica, fluorine polymers, wax, higher fatty acid amide, etc. can be added within a range as far as they do not hinder the objective of this invention.

As for a method to coat the coating solution, it can be done by using a roll coater, a gravure coater, a bead coater, a microgravure coater, a wire bar coater, a reverse roll coater, etc.

After coating the coating solution on a substrate, it is cured by warm air, a heat treatment or a an active beam irradiation and the heat resisting slipping layer is formed.

As for the concrete example of the cure, though it depends on the resin to be used, it is in general at around 50° C.-80° C. for 30 seconds —10 minutes in case of the warm air drying and at around 100° C.-150° C. for 30 seconds —10 minutes in case of the heat treatment. and in case of the active beam irradiation, an ultraviolet beam irradiation is main, and it is around 4–60 seconds from about 15 cm distance with an ultraviolet lamp of 80 w/cm.

As for the thickness of the heat resisting slipping layer of this invention, thought it depends on particle size of the silicone resin powder and the metal salt powder of a higher fatty acid and/or the metal salt powder of a higher fatty acid phosphate, it is preferable if it is 0.1 $\mu$m–10 $\mu$m, and is more preferable if it is 0.5–5 $\mu$m on dry film thick basis.

The thermal transfer printing dyecoat to be used in this invention is formed by dissolving a thermal diffusion dye and a binder polymer with a good heat resistance in a suitable solvent to form a coating composition, and by coating the compoisition on a substrate, and thereafter drying.

As for the thermal diffusion dye, dyes of non-ionic azo group, anthraquinone group, azomethine group, methine group, indoaniline group, naphthoquinone group, nitro group, etc. can be enumerated.

And as for the binder polymer, for example, polycarbonates, polyvinyl butyral, and methyl and ethyl celluloses can be enumerated.

For the coating composition, an organic and/or inorganic fine particulate, a dispersing agent, an antistatic agent, an antifoaming agent, a leveling agent, etc. can be incorporated if necessary.

As for solvent to prepare the coating composition, dioxane, toluene, tetrahydrofuran, methylene chloride, trichloroethylene, etc. can be used, but it is preferable if it is a non-halogenic solvent. And as for the solvent, it can be used independently or in a form of a mixed solvent with 2 or more.

As for a method to coat the substrate with the coating composition, it can be done by using a roll coater, a gravure coater, a bead coater, a microgravure coater, a wire bar coater, a reverse roll coater, an airdoctor coater, etc.

As for the dyecoat layer thickness, it is preferable to be 0.1–5 μm on dry film thickness basis.

In order to record an image by using the thermal transfer printing dyesheet of this invention, it is practised that the dyecoat of the thermal transfer printing dyesheet is laid on a dye receiving layer of a receiver for the thermal transfer printing, the dye in the dyecoat is transferred to the dye receiving layer of the receiver by heating from back face (where there is the heat resisting slipping layer) of the thermal transfer printing dyesheet with a thermal head which generates heat according to an applied electrical image signal.

This invention is further explained in detail by showing examples and comparative examples, but this invention is not one which is limited by them. The part described in the text is based on a weight standard.

As for the evaluation, it was carried out by methods described below.

Scratching

The thermal transfer printing dyesheet and a receiver for the thermal transfer printing were laid together to contact the dyecoat of the dyesheet with the dye receiving layer, on the heat resisting slipping face, electrical power of 0.32 w/dot was input for 10 milliseconds to a thermal head having a heating resistor of 6 dots/mm, to transfer dye to make a printed area of 3 cm long and 8 cm wide. The number of longitudinal lines on the image face was then determined and recorded.

Creasing

As similar to the above, the thermal transfer printing dyesheet and the receiver for the thermal transfer printing were laid together to contact the thermal transfer printing ink layer with the dye receiving layer, on the heat resisting slipping face, electrical power of 0.32 w/dot was input for 10 milliseconds to a thermal head having a heating resistor of 6 dots/mm to transfer dye to make a printed area of 5 cm long and 8 cm wide. And the transfer printing was carried out once more by using the receiver for the thermal transfer printing obtained by the printing and a new thermal transfer printing dyesheet to duplicate the print image face. This procedure was repeated once more to print 3 times in total, and then numbers of creases developed on the recorded image face was determined.

Storage stability

The thermal transfer printing dyesheet was wound in a roll, was left for 10 days in an atmosphere of 60° C. and 80% relative humidity in a condition that the heat resisting slipping layer and the ink layer were directly contacted, and then presence or absence of dye crystal in the ink layer was observed by using an optical microscope. One in which the crystal was clearly observed was evaluated as Deteriorated, and one which was not was as good.

Example 1

A heat resisting slipping layer of about 2 μm dry film thickness was obtained by uniformly coating a resin composition (1) of below-listed components, using No 3 wire bar, onto one face of a 6 μm polyester film (Lumirror, Toray product), as a substrate, drying for 10 seconds with a dryer, and then curing by irradiation from 15 cm distance with using a 80 W/cm ultraviolet beam irradiation apparatus (UVC-254, Ushio product).

| Resin composition (1) | |
|---|---|
| Ebecryl 220 | 60 parts |
| isobornyl acrylate | 26 parts |
| Diakon LG 156 | 14 parts |
| Atmer 129 | 1 part |
| polymethyl silsesquioxane silicone resin powder | 15 parts |
| Quantacure ITX. | 1.7 parts |
| Quantacure EPD | 1.7 parts |
| Irgacure 907 | 3.4 parts |
| methyl isobutyl ketone | 150 parts |

(where: Ebecryl 220 is a 6 functional radical polymerisable urethane acrylate from Daicel UCB), isbornyl acrylate is a monofunctional radical polymerisable compound, Diakon LG 156 is a polymethyl methacrylate product from ICI, Atmer 129 is an antistatic agent from ICI, Quantacure ITX is a photoinitiator from International Biosynthetics, Quantacure EPD is a photosensitizer from Internatiol Biosynthetics, Irgacure 907 is a photoinitiator from Ciba-Geigy, and the polymethyl silsesquioxane silicone resin powder had a mean particle size of 2.0 μm)

Then, a thermal transfer printing dyecoat composition (A) comprising below-listed components was prepared, and a thermal transfer printing dyesheet was obtained by forming an dyecoat of about 1.0 μm thickness by coating it on the reverse face to the face on which the heat resisting slipping layer was formed, of the substrate and by drying the coated film.

| Thermal transfer printing dyecoat - Composition (A) | |
|---|---|
| Dispersol Red B-2B (a disperse dye from ICI) | 4 parts |
| ethyl cellulose | 4.4 parts |
| tetrahydrofuran | 90 parts |

On the other hand, by using a polyester film (Melinex 990, ICI product) of 100 μm thickness, a receiver for the thermal transfer printing was obtained by preparing a composition (B) for a dye receiving layer formation comprising below-listed components, by coating on its one face with using wire bar No 6, and by forming the dye receiving layer of about 4 μm dry film thickness.

| Dye-receiving layer - Composition (B) | |
| --- | --- |
| polyester resin | 100 parts |
| M 468 (aminosilaxane from ICI) | 4 parts |
| Degacure K126 (ouring agent - Degussa) | 0.7 part |
| triethylenediamine | 0.3 part |
| methyl ethyl ketone/toluene (4/6) | 200 parts | where the polyester resin had an average molecular weight of 17000, and a glass transition temperature of 67° C.

The thermal transfer printing dyesheet and the receiver for the thermal transfer printing obtained were laid together to contact the thermal transfer printing dyecoat with the dye receiving layer, printing was carried out, and the scratching of the printed image and the numbers of creases developed on the recorded image face were determined. The storage stability of the thermal transfer printing dyesheet was also measured.

The results were shown in the table 1, but the thermal transfer printing dyesheet obtained was one having excellent freedom from scratching, crease and storage stability.

EXAMPLE 2

A thermal transfer dyesheet was prepared and evaluated in the similar manner to the example 1 except that the resin composition to form the heat resisting slipping layer was changed to the resin composition (2) shown below.

Dry film thickness of the heat resisting slipping layer was about 2 μm.

| Resin composition (2) | |
| --- | --- |
| Ebecryl 220 | 60 parts |
| isbornyl acrylate | 26 parts |
| Diakon LG 156 | 14 parts |
| Atmer 129 | 1 part |
| polymethyl silsesquioxane silicone resin powder (mean particle size: 1.6 μm) | 7.5 parts |
| calcium stearate (mean particle size: 2.3 μm, melting point: 150° C.) | 7.5 parts |
| Quantacure XTX | 1.7 parts |
| Quantacure EPD | 1.7 parts |
| Irgacure 907 | 3.4 parts |
| methyl isobutyl ketone | 150 parts |

The results were shown in the table 1, but the thermal transfer printing dyesheet obtained was one having excellent freedom from scratching, crease and storage stability.

EXAMPLE 3

A thermal transfer dyesheet was prepared and evaluated in the similar manner to the example 1 except that the resin composition to form the heat resisting slipping layer was changed to the resin composition (3) shown below and the curing time was changed to at 100° C. for 5 minutes.

Dry film thickness of the heat resisting slipping layer was about 2 μm.

| Resin composition (3) | |
| --- | --- |
| polyester urethane | 60 parts |
| polymethyl silsesquioxane silicone resin powder (mean particle size: 1.6 μm) | 5 parts |
| Atmer 129 | 0.5 part |
| MEK/toluene (1/1) | 100 parts | where the polyester urethane was UR 1400, Toyobo product, having number average molecular weight of 40000, and Tg of 89° C.

The results were as shown in Table 1 below. The thermal transfer printing dyesheet obtained was one having excellent freedom from scratching, crease and storage stability.

EXAMPLE 4

A thermal transfer dyesheet was prepared and evaluated in the similar manner to the example 1 except that the resin composition to form the heat resisting slipping layer was changed to the resin composition (4) shown below.

Dry film thickness of the heat resisting slipping layer was about 3 μm.

| Resin composition (4) | |
| --- | --- |
| Ebecryl 220 | 60 parts |
| isobornyl acrylate | 26 parts |
| Diakon LG 156, ICI product) | 14 parts |
| Atmer 129 | 1 part |
| polymethyl silsesquioxane silicone resin powder, mean particle size: 1.6 μm | 5 parts |
| zinc stearate, mean particle size: 2.5 μm, melting point: 130° C. | 5 parts |
| Quantacure ITX | 1.7 parts |
| Quantacure EPD | 1.7 parts |
| Irgacure 907 | 3.4 parts |
| methyl isobutyl ketone | 150 parts |

The results were as shown in Table 1 below. The thermal transfer printing dyesheet obtained was one having excellent freedom from scratching, crease and storage stability.

EXAMPLE 5

A thermal transfer dyesheet was prepared and evaluated in the similar manner to the example 1 except that the resin composition to form the heat resisting slipping layer was changed to the resin composition (5) shown below. Dry film thickness of the heat resisting slipping layer was about 3 μm.

| Resin composition (5) | |
| --- | --- |
| Ebecryl 220 | 50 parts |
| isbornyl acrylate | 26 parts |
| Diakon LG 156 | 14 parts |
| Atmer 129 | 1 part |
| polymethyl silsesquioxane silicone resin powder, mean particle size: 0.6 μm | 5 parts |
| calcium stearate phosphate | 10 parts |
| Quantacure ITX | 1.7 parts |
| Quantacure EPD | 1.7 parts |
| Irgacure 907 | 3.4 parts |
| methyl isobutyl ketone | 150 parts |

The results were as shown in Table 1 below. The thermal transfer printing dyesheet obtained was one having excellent freedom from scratching, crease and storage stability.

EXAMPLE 6

A thermal transfer dyesheet was prepared and evaluated in the similar manner to the example 1 except that the resin composition to form the heat resisting slipping layer was changed to the resin composition (6) shown below and the curing time was changed to at 100° C. for 5 minutes.

Dry film thickness of the heat resisting slipping layer was about 3 μm.

| Resin composition (6) | |
|---|---|
| UR 1400 | 100 parts |
| polymethyl silsesquioxane silicone resin powder, mean particle size: 1.6 μm | 15 parts |
| zinc stearate phosphate, mean particle size: 2.5 μm, melting point: 190° C. | 5 parts |
| Atmer 129 | 0.5 part |
| MEK/toluene (mixing ratio: 1/1) | 100 parts |

The results were as shown in Table 1. The thermal transfer printing dyesheet obtained was one having excellent freedom from scratching, crease and storage stability.

COMPARATIVE EXAMPLE 1

A thermal transfer dyesheet was prepared and evaluated in the similar manner to the example 1 except that the resin composition to form the heat resisting slipping layer was changed to the resin composition (1') shown below.

Dry film thickness of the heat resisting slipping layer was about 2 μm.

| Resin composition (1') | |
|---|---|
| Ebecryl 220 | 60 parts |
| isbornyl acrylate | 26 parts |
| Diakon LG 156 | 14 parts |
| Atmer 129 | 1 part |
| acrylic silicone, (KP-601. Shinetsu Chemical product) | 5 parts |
| Quantacure ITX | 1.7 parts |
| Quantacure EPD | 1.7 parts |
| Irgacure 907 | 3.4 parts |
| methyl isobutyl ketone | 150 parts |

The results were shown in the table 1, but the thermal transfer printing dyesheet obtained was one having good freedom from scratching. However crease and storage stability were inferior.

COMPARATIVE EXAMPLE 2

A thermal transfer dyesheet was prepared and evaluated in the similar manner to the example 1 except that the resin composition to form the heat resisting slipping layer was changed to the resin composition (2') shown below.

Dry film thickness of the heat resisting slipping layer was about 2 μm.

| Resin compositin (2') | |
|---|---|
| Ebecryl 220, | 60 parts |
| isbornyl acrylate | 26 parts |
| Diakon LG 156 | 14 parts |
| Atmer 129 | 1 part |
| acrylic silicone (X-24-8201, Shinetsu Chemical product) | 10 parts |
| Quantacure ITX | 1.7 parts |
| Quantacure EPD | 1.7 parts |
| Irgacure 907 | 3.4 parts |
| methyl isobutyl ketone | 150 parts |

The results were as shown in Table 2. The thermal transfer printing dyesheet obtained was one having good freedom from scratching, but crease and storage stability were inferior.

COMPARATIVE EXAMPLE 3

A thermal transfer dyesheet was prepared and evaluated in the similar manner to Example 1 except that the resin composition to form the heat resisting slipping layer was changed to the resin composition (3') shown below.

Dry film thickness of the heat resisting slipping layer was about 2 μm.

| Resin composition (3') | |
|---|---|
| UR 1400 | 100 parts |
| Silicone wax (Tg: 65° C.) | 10 parts |
| Atmer 129 | 0.5 part |
| MEK/Toluene (mixing ratio: 1/1) | 100 parts |

The results were as shown in Table 2. The thermal transfer printing dyesheet obtained was one having good crease resistance, but scratching and storage stability were inferior.

COMPARATIVE EXAMPLE 4

A thermal transfer dyesheet was prepared and evaluated in the similar manner to Example 1 except that the resin composition to form the heat resisting slipping layer was changed to the resin composition (4') shown below.

Dry film thickness of the heat resisting slipping layer was about 3 μm.

| Resin composition (4') | |
|---|---|
| Ebecryl 220 | 60 parts |
| isbornyl acrylate | 26 parts |
| Diakon LG 156 | 14 parts |
| Atmer 120 | 1 part |
| acrylic silicone (monofunctional radical polymerisable compound) | 5 parts |
| zinc stearate phosphate, (mean particle size: 2.5 μm, melting point: 190° C.) | 5 parts |
| Quantacure XTX | 1.7 parts |
| Quantacure EPD | 1.7 parts |
| Irgacure 907 | 3.4 parts |
| methyl isobutyl ketone | 150 parts |

The results were as shown in Table 2. The thermal transfer printing dyesheet obtained was one of which all of the scratching, creasing and storage stability were inferior.

TABLE 1

| Evaluation item | Examples | | | | | |
|---|---|---|---|---|---|---|
|  | 1 | 2 | 3 | 4 | 5 | 6 |
| Scratching (lines) | 0 | 0 | 0 | 0 | 0 | 0 |
| Creasing (lines) | 0 | 0 | 0 | 0 | 0 | 0 |
| Storage stability | good | good | good | good | good | good |

TABLE 2

| Evaluation item | Comparative Examples | | | |
|---|---|---|---|---|
|  | 1 | 2 | 3 | 4 |
| Scratching | 0 | 0 | 5 | 1 |

TABLE 2-continued

| Evaluation item | Comparative Examples | | | |
|---|---|---|---|---|
| | 1 | 2 | 3 | 4 |
| (lines) Creasing (lines) | 8 | 6 | 0 | 1 |
| Storage stability | deteriorated | deteriorated | deteriorated | deteriorated |

Effect of Invention

As shown be the above Examples, thermal transfer printing dyesheet of this invention having a heat resisting slipping layer comprisingc a silicone resin powder having silsesquioxane structure, and metal salt powder of a higher fatty acid and/or metal salt powder of a higher fatty acid phosphate showed superior travelling, had an outstanding freedom from scratching, did not develop creases and moreover its storage stability was an excellent one having no adverse effect on the dyecoat.

We claim:

1. A thermal transfer printing dyesheet comprising a sheet substrate having at least a thermal transfer dyecoat on one face and a heat resisting slipping layer on the other face, characterised in that the heat resisting slipping layer comprises a silicone resin powder having silsesquioxane structure, and at least one of a metal salt powder of a higher fatty acid and a metal salt powder of a higher fatty acid phosphate.

2. A thermal transfer printing dyesheet as claimed in the claim 1, characterised in that the mean particle size of the silicone resin powder having silsesquioxane structure is 5 $\mu$m or less, and its incorporation amount in the heat resisting slipping layer is 0.2 volume % or more and 60 volume % or less.

3. A thermal transfer printing dyesheet as claimed in the claim 1, characterised in that the mean particle size of the silicone resin powder and the metal salt powder together is 5 $\mu$m or less and their total incorporation amount in the heat resisting slipping layer is 0.2-60 volume %.

4. A thermal transfer printing dyesheet as claimed in the claim 1, characterised in that the mixing ratio (a)/(a)+(b), where (a) is the silicone resin powder having silsesquioxane structure and (b) is the metal salt powder of a higher fatty acid and/or metal salt powder of a higher fatty acid phosphate, is at least 5 weight %.

* * * * *